March 1, 1932. B. M. JORDON 1,847,112
INTERLOCKING MECHANISM
Filed Sept. 24, 1929
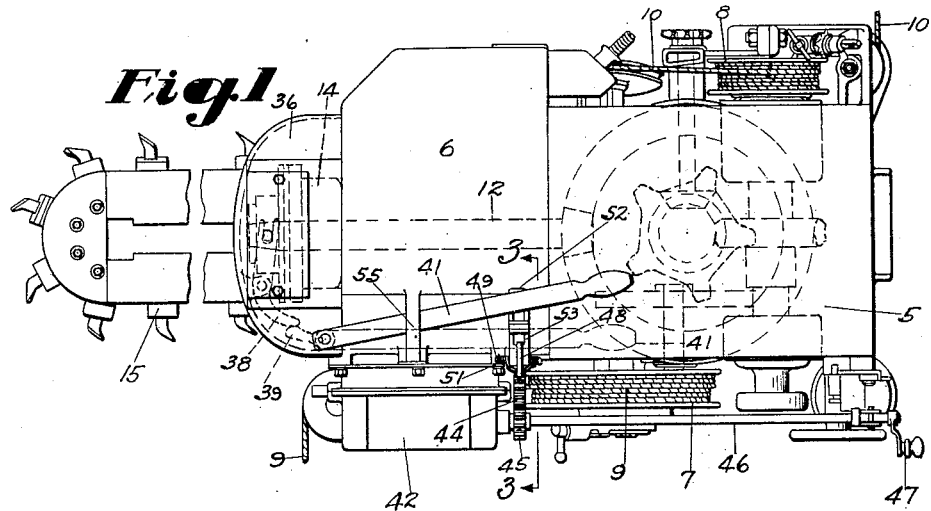
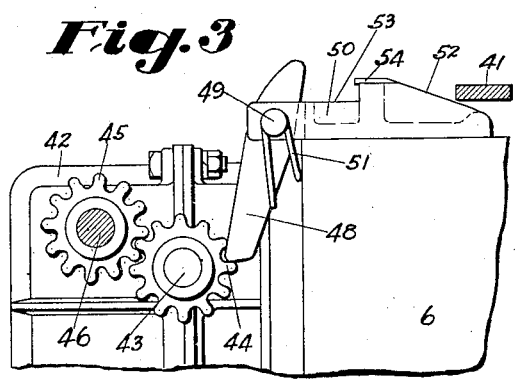
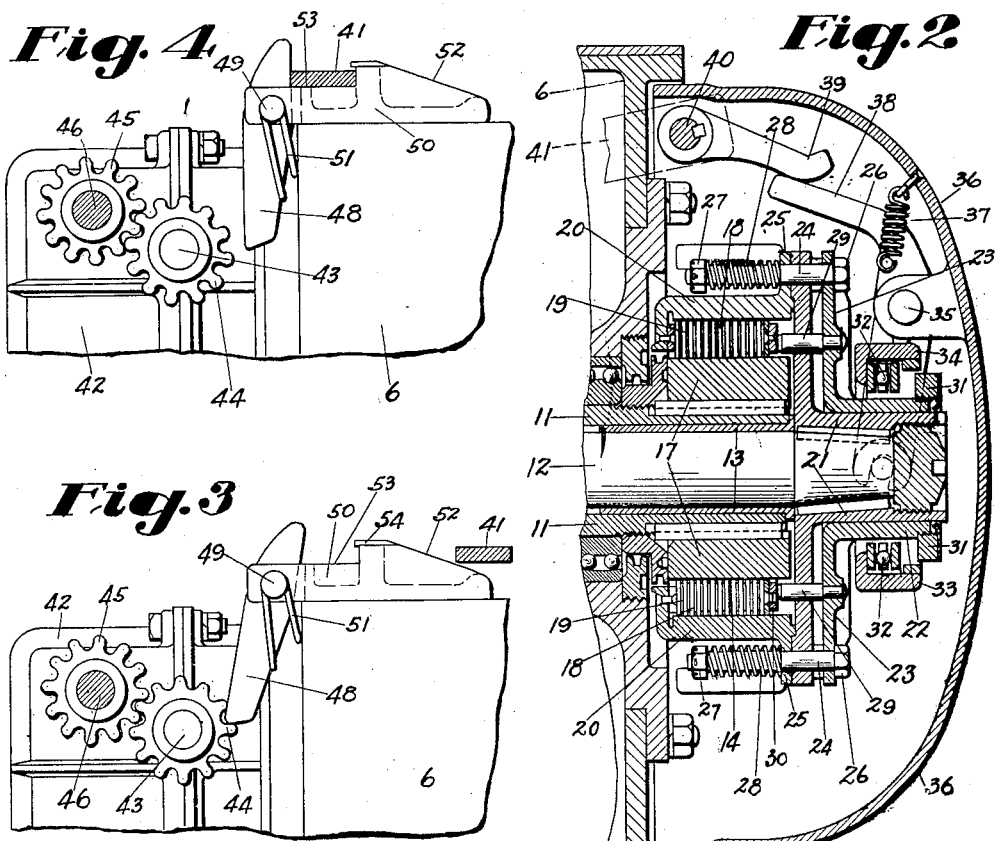
INVENTOR:
BENJAMIN MARSH JORDON.
BY
ATTORNEYS.

Patented Mar. 1, 1932

1,847,112

UNITED STATES PATENT OFFICE

BENJAMIN MARSH JORDON, OF SALT LAKE CITY, UTAH, ASSIGNOR TO THE JEFFERY MANUFACTURING CORPORATION, OF COLUMBUS, OHIO, A CORPORATION OF OHIO

INTERLOCKING MECHANISM

Application filed September 24, 1929. Serial No. 394,864.

This invention relates to new and useful improvements in interlocking devices.

An important object of the invention is to provide means compelling the speeding up of a drive shaft before a load is imposed thereon. More specifically, the important object of the invention is to provide interlocking means between an electric controller mechanism and a clutch associated with an armature which compels the clutch to be disengaged before the controller can be actuated, so as to necessitate increasing the speed of the drive shaft by manipulation of the controller before a load is imposed upon the drive shaft by engaging the clutch.

Another important object of the invention is to provide interlocking means operated upon movement of the clutch into engaged position for preventing operation of the controller.

A still further object of the invention is to provide a normally engaged clutch with operating means for disengaging the same and means cooperating with the clutch operator for preventing actuation of a controller when the clutch is in its normal engaged condition.

A still further object of the invention is to provide an automatically actuated detent for locking a controller mechanism and which is actuated by a clutch operator to lock the controller mechanism when the clutch is engaged.

Other objects and advantages of the invention will become apparent during the course of the following description.

In the accompanying drawings forming a part of the description and wherein like numerals are employed to designate like parts throughout the several views, Figure 1 is a plan of a mining machine illustrating the interlocking mechanism applied thereto and disposed in such position that the clutch is engaged and the controller mechanism locked.

Figure 2 is an enlarged section of the front end of the motor casing of such machine illustrating the clutch mechanism.

Figure 3 is a transverse section taken along the line 3—3 of Figure 1, illustrating the parts in position when the clutch is engaged, and Figure 4 is a similar view showing the parts in position when the clutch is disengaged to permit actuation of the controller.

Referring now more particularly to the drawings, I have elected to illustrate the invention as applied to a mining machine, but it is to be understood that the use of the invention is in no wise restricted to such use or specific application.

The numeral 5 designates a mining machine of any type, although it is here shown as being of the short-wall type. Upon this machine is mounted a motor 6 adapted to actuate a feed drum 7 and a retarding drum 8 to wind or pay out flexible draft members 9 and 10, which feed the machine in its coal cutting movements as is well understood in the art. The armature of this motor is mounted upon a sleeve 11 which is rotatably mounted upon a drive shaft 12 by means of a bushing 13 and is connected to or disconnected from the armature sleeve by a clutch mechanism indicated in its entirety by the numeral 14. This drive shaft 12 not only actuates the drums 7 and 8, but also the endless cutter chain 15 through gearing illustrated in dotted lines in Figure 1. This gearing is well understood in the mining art and a further description thereof is believed unnecessary.

The clutch 14 hereinbefore referred to is of the friction disc type and comprises a drive member 17 keyed to the armature sleeve 11 and includes the well known type of clutch discs 18 cooperating with complementary clutch discs 19 carried by the driven member 20 of the clutch. This driven member 20 is provided with a hub 21, which is keyed to the end of the shaft 12 and is adapted to drive the shaft upon compression of the clutch discs 18 and 19.

In order that the clutch 14 may be automatically held in its engaged position and manually disengaged, a hub 22 is concentrically and slidably mounted upon the hub 21 of the driven member. This hub 22 is provided with an annular flange or face plate 23, in the outer edge of which are carried a plurality of bolts 24 which extend through an outwardly extended annular flange 25 of the driven member 20. These bolts 24 are equipped with heads 26 for abutment against the outer face of the flange 23 and with nuts 27 at their inner ends to serve as abutments for corresponding ends of compression springs 28 placed upon the bolts with their other ends abutting the inner face of the annular flange 25. As will be obvious, these springs 28 normally urge the flange 23 toward the driven member and in order to cause this normal action to normally hold the clutch discs 18 and 19 in engaged positions, the flange 23 carries a plurality of thrust pins 29 rigidly attached thereto and extended through apertures of the flange of hub 21 of the driven member. The inner ends of the pins 29 are adapted to engage a thrust ring 30 slidably mounted between the drive and driven members for transmitting the action of the springs 28 to cause the clutch discs 18 and 19 to be normally engaged, thereby causing normal engagement of the drive and driven members of the clutch.

The clutch is disengaged manually by sliding the hub 22 axially and outwardly along the hub 21. This is accomplished by adjustably threading a thrust collar 31 on the outer end of the hub 22 to co-act with a ball bearing thrust collar 32 housed within a yoke 33, which is moved by a lever 34 pivotally mounted on a pin 35 supported by the clutch housing 36, as shown. This lever is normally urged to move the hub 22 inwardly to engage the clutch by means of a tension spring 37 secured to the lever 34 at one end and at its other end to the clutch housing.

The outer end of the lever 34 is provided with an angularly disposed extension 38 normally held in contact with an arm 39 by means of the spring 37. The outer end of this arm is provided with a cam portion, as shown, and the other end of the arm is keyed to a pin 40 journalled in the clutch housing 36. To the other end of the pin 40, which extends outside of the clutch housing, is secured a clutch operating lever 41 by which the clutch is manually moved to its disengaged position.

An electric controller mechanism 42 is mounted upon one side of the mining machine as clearly shown in Figure 1, for controlling the operation and speed of the electric motor 6. This controller mechanism includes a shaft 43 secured to the controller mechanism and provided with an external gear 44 meshing with a similar gear 45 keyed to an actuating shaft 46, which extends along one side of the mining machine to a point adjacent the drum controlling mechanism where it is provided with an operating handle 47. By rotating this handle 47, the electric controller mechanism is actuated through the gears 44 and 45.

When alternating current is used for operating the mining machine, it is necessary to speed up the motor before imposing a load thereon by "throwing in" or engaging the clutch 14. In order to compel this sequence of operations, an interlocking device is provided to form a connection between the clutch and the controller mechanism. This interlocking device consists primarily of a pivoted spring-pressed latch or detent 48 adapted to automatically move into a position to block rotation of the gear 44 in one direction when the clutch operating handle 41 is in a position to permit an engagement of the clutch 14. The detent 48 is pivotally suspended between its ends on a horizontal pin 49 extended through an end of a block 50, which hangs over the edge of the motor casing 6, so that the longer end of the detent is disposed between the gear 44 and motor casing. A spring 51 mounted upon the pin 49 has one end engaging the motor casing 6 and its other end engaging behind the elongated end of the detent to normally urge it toward the controller gear 44 to engage the same between a pair of teeth thereof.

The block 50 is provided with an inclined guiding surface 52 along which the clutch operating handle 41 is adapted to slide when moving to a position to disengage the clutch 14. This block is also provided with a seat 53 in which the clutch operating handle 41 is adapted to be received when the clutch is disengaged. This seat provides a vertical wall or abutment against which the clutch lever 41 is normally urged by the spring 37 of the clutch mechanism, when the clutch lever is disposed in said seat. This movement is also augmented by the action of the detent pawl 48. The upper end of the detent 48 forms one wall of the seat and is disposed in the path of movement of the clutch operating handle as it moves to a position to disengage the clutch. When the clutch operating handle is disposed in its seat 53, its accidental displacement therefrom is prevented by an overhanging shoulder 54, but it can be removed from its seat and swung upon its pivot 40 by moving the clutch handle 41 toward the detent 48, causing its lower end to swing away from the gear 44 sufficiently to enable the clutch handle being raised from beneath the overhanging shoulder 54 and swung upon its pivot to allow the clutch to move into its engaged position. In order to restrict vertical and horizontal movements of the clutch lever, a guide 55 is secured to the motor housing to overlap the lever, as clearly shown in Figure 1.

When the clutch operating handle 41 is arranged in the position shown in Figures 1 and 3, the clutch 14 is engaged and the detent 48 is in locking relation to the gear 44 to prevent rotation thereof in a direction for turning on the electric motor. Obviously, the controller mechanism cannot be operated to turn the motor on in this position when the shaft 12 is loaded by reason of the clutch being engaged. This necessitates disengagement of the clutch before the electric controller mechanism can be manipulated to turn the motor on. The release of the controller mechanism is accomplished by moving the clutch operating handle 41 into its seat 53, which action causes the detent 48 to be engaged and its lower end disengaged from the gear 44, as the clutch is disengaged. This releases the controller mechanism which can then be actuated to speed up the motor before the clutch is engaged and the load placed upon the drive shaft 12. Obviously, when the clutch is engaged and the parts are in the position shown in Figure 3, the motor can be turned off, as the detent 48 does not prevent the controller gear 44 from being rotated by the controller mechanism in a clockwise direction.

Having fully described the invention and its mode of operation, it is to be understood that various changes in the size, shape and arrangement of parts may be resorted to without departing from the spirit of the invention or the scope of the appended claims.

What I claim is:

1. The combination with a prime mover having a controller mechanism, a clutch and a clutch operator; of a detent normally engaging said controller mechanism to prevent operation of the same to an "on" position and arranged in the path of the clutch operator disengaging movement to be moved to a position to release said controller.

2. The combination with a prime mover having a controller mechanism, a clutch and a clutch operator; of a detent normally engaging said controller mechanism to prevent operation of the same and arranged in the path of the clutch operator disengaging movement to be moved to a position to release said controller, and means for preventing accidental movement of said clutch operator when in clutch disengaging position.

3. The combination with a prime mover having a controller mechanism, a clutch and a clutch operator; of a spring-pressed detent pivoted between its ends and having one end normally urged into engagement with said controller mechanism to prevent operation thereof and its other end arranged in the path of clutch operator disengaging movement to be moved to release said controller mechanism.

4. The combination with a prime mover having a controller mechanism, a clutch, and a clutch operator; of a latch mechanism for releasably retaining said operator in a position to disengage the clutch, said latch mechanism including means cooperating with the controller mechanism for preventing movement of the controller when the clutch operator is released from said latch mechanism.

5. The combination with a prime mover having a controller mechanism, a normally engaged clutch and a clutch operator; a latch mechanism including a seat for the reception of said clutch operator when in a position to disengage said clutch, and a detent engaging said controller mechanism to prevent actuation thereof when the clutch operator is out of said seat, said detent being disengaged from the controller mechanism when said clutch operator is in said seat.

6. The combination with a prime mover having a controller mechanism, a normally engaged clutch and a clutch operator; a member provided with a seat having an overhanging shoulder and a guiding surface leading thereto, said seat being adapted for the reception of said clutch operator when in a position to disengage said clutch, of a spring-pressed detent pivotally mounted on said member and normally engaging said controller mechanism to prevent actuation thereof when the clutch operator is out of said seat, said detent being disengaged from the controller mechanism when said clutch operator is in said seat, and said detent serving to releasably retain said clutch operator beneath said overhanging shoulder.

7. The combination with a prime mover having a controller mechanism including a gear, a clutch, and clutch operator; of a detent engageable with said gear upon movement of the clutch operator to a position to engage said clutch for preventing operation of the controller mechanism when the clutch is engaged.

8. The combination with a prime mover having a controller mechanism including a gear, a clutch, and clutch operator; of a detent engageable with said gear upon movement of the clutch operator to a position to engage said clutch for preventing operation of the controller mechanism when the clutch is engaged, and said detent being automatically disengaged from the gear upon movement of the clutch operator to a position to disengage the clutch to permit operation of the controller mechanism.

9. The combination with a prime mover having a controller mechanism, a normally engaged clutch, a pivoted clutch operating lever; of a latch mechanism for releasably retaining said lever in a position to disengage the clutch, said latch mechanism including a seat for the reception of said clutch lever when in a position to disengage the clutch, and a detent engaging said controller mechanism to prevent actuation thereof when the clutch lever is out of said seat, said detent being disengaged from the controller mechanism when the clutch lever is in said seat.

10. The combination with a prime mover having a controller mechanism, a clutch, a clutch operator movable relative to the controller mechanism, and means alternately engageable with the controller and operator for alternately preventing operation of the controller and for releasably retaining the operator in clutch disengaging position.

11. The combination with a prime mover having a controller mechanism, a clutch, a clutch operator movable relative to the controller mechanism, a pivoted detent having opposite ends alternately engageable with the controller mechanism and operator for alternately preventing operation of the controller and for releasably retaining the operator in clutch disengaging position.

12. The combination with a prime mover having a controller mechanism, a clutch, a clutch operator movable relative to the controller mechanism, means alternately engageable with the controller and operator for alternately preventing operation of the controller and for releasably retaining the operator in clutch disengaging position, said operator automatically causing disengagement of said means from the controller mechanism when said operator is moved to disengage the clutch.

13. The combination with a prime mover having a controller mechanism, a clutch, a clutch operator movable relative to the controller mechanism, a pivoted detent having opposite ends alternately engageable with the controller mechanism and operator for alternately preventing operation of the controller and for releasably retaining the operator in clutch disengaging position, said operator automatically causing disengagement of said detent from the controller mechanism when said operator is moved to disengage the clutch.

14. The combination with a prime mover having a controller mechanism, a clutch, a clutch operator normally urged to clutch engaging position, an abutment in the path of movement of said operator, means normally engageable with said controller mechanism to prevent operation of the same and arranged in the path of the clutch operator disengaging movement to be moved to a position to release said controller, and said abutment serving to retain said clutch operator in clutch disengaging position.

15. The combination with a prime mover having a controller mechanism, a clutch, a clutch operator normally urged to clutch engaging position, an abutment in the path of movement of said operator, a pivoted detent having one end normally engaged with said controller mechanism to prevent operation of the same, the other end of said detent being arranged opposite the abutment and in the path of the clutch operator disengaging movement to be moved to a position to release said controller, and said other end of the detent and said abutment forming a seat for releasably retaining the operator in clutch disengaging position.

16. The combination with a prime mover having a controller mechanism, a clutch, a clutch operator normally urged to clutch engaging position, an abutment in the path of movement of said operator, a pivoted spring pressed detent having one end normally urged into engagement with said controller mechanism to prevent operation of the same, the other end of said detent being normally urged toward said abutment and in the path of the clutch operator disengaging movement to be moved to a position to release said controller, and said other end of the detent and said abutment forming a seat for releasably retaining the operator in clutch disengaging position.

17. The combination with a prime mover having a controller mechanism, a clutch, a clutch operator normally urged to clutch engaging position, an abutment in the path of movement of said operator, a pivoted spring pressed detent having one end normally urged into engagement with said controller mechanism to prevent operation of the same, the other end of said detent being normally urged toward said abutment and in the path of the clutch operator disengaging movement to be moved to a position to release said controller, and said other end of the detent arranged to press said operator against said abutment to releasably retain the operator in clutch disengaging position.

In testimony whereof I have hereunto set my hand.

BENJAMIN MARSH JORDON.